(12) United States Patent
Zimpfer

(10) Patent No.: US 7,219,494 B2
(45) Date of Patent: May 22, 2007

(54) HYDRAULIC SYSTEM COMPRISING PRESSURE-CONTROLLED DAMPING MEANS

(75) Inventor: Michael Zimpfer, Ettlingen (DE)

(73) Assignee: Eaton Fluid Power GmbH, Baden Baden (DE)

( * ) Notice: Subject to any disclaimer, the term of this patent is extended or adjusted under 35 U.S.C. 154(b) by 33 days.

(21) Appl. No.: 10/514,060

(22) PCT Filed: May 4, 2003

(86) PCT No.: PCT/DE03/01455

§ 371 (c)(1),
(2), (4) Date: Nov. 10, 2004

(87) PCT Pub. No.: WO03/095845

PCT Pub. Date: Nov. 20, 2003

(65) Prior Publication Data

US 2005/0172620 A1 Aug. 11, 2005

(30) Foreign Application Priority Data

May 14, 2002 (DE) ................. 102 21 276

(51) Int. Cl.
*F16D 31/02* (2006.01)
(52) U.S. Cl. ..................................... 60/469

(58) Field of Classification Search .................. 60/469
See application file for complete search history.

(56) References Cited

U.S. PATENT DOCUMENTS

| 4,704,947 | A | * | 11/1987 | Schneider | ............. | 91/518 |
| 5,098,263 | A | * | 3/1992 | Hattori et al. | ............. | 417/540 |
| 5,191,826 | A | | 3/1993 | Brunner | | |
| 6,003,427 | A | * | 12/1999 | Asbrand et al. | ............. | 60/469 |

FOREIGN PATENT DOCUMENTS

DE       196 22 762 A1    12/1997

* cited by examiner

*Primary Examiner*—F. Daniel Lopez
(74) *Attorney, Agent, or Firm*—Benesch, Friedlander, Coplan & Aronoff LLP

(57) ABSTRACT

Hydraulic systems generally comprise expansion hose lines and other damping elements which are provided with one or several serially connected hose chambers according to the generated pressure pulsation. The damping measures of the inventive hydraulic system are initiated according to the prevailing pressure during operation thereof. The aim of the invention is to keep the loss of pressure low and save a significant amount of energy during continuous operations. Said aim is achieved by a direct line connection between the source of pressure and the user, which bypasses the dampers. Said bypass line is blocked by a valve when the pressure in the system increases.

12 Claims, 2 Drawing Sheets

HYDRAULIC SYSTEM COMPRISING PRESSURE-CONTROLLED DAMPING MEANS

RELATED APPLICATIONS

This application claims priority to international patent application numbers PCT/DE03/01455, filed on May 7, 2003; and DE 102 21 276.7, filed on May 14, 2002, the disclosure of which is incorporated by reference herein in its entirety.

BACKGROUND OF THE INVENTION

1. Field of the Invention

The invention relates to a pressurized fluid power transmission system such as, for example, a hydraulic system and its damping device.

2. Description of the Related Art

In power transmission systems which use a compressible or incompressible pressurized fluid for power transmission, i.e., in pneumatic systems or hydraulic systems, pulsation dampers are frequently interposed between the pressure source and the load, said dampers damping pulsations due to the pressure source or the user. Such pulsation dampers are, for example, expansion hoses which, in addition, may contain installed in them, for example, resonator pipes or reflectors for the generation of pressure wave interferences to extinguish such pressure waves. Such damping devices are interposed between the pressure source and the user.

Pressurized fluid power transmission systems are frequently used in situations in which the load varies, i.e., is not constant in terms of time. Likewise, the pumping rate of the pressure source may fluctuate as a function of the speed of the engine, for example.

Damping devices exhibit a specific resistance to flow which may lead to energy losses in the power transmission system. These losses are of consequence from the viewpoint of economic efficiency. On the other hand, damping devices cannot just be omitted.

In addition, damping devices frequently are effective only for a more or less wide band of pressure pulsations. If all pressure pulsations occurring in every conceivable state of operation are to be eliminated by the damping device, a complex damping device with correspondingly high resistance to flow is the result.

Considering this, the problem to be solved by the invention is to provide a pressurized fluid power transmission system, which works very efficiently and reduces pressure pulsations to a tolerable minimum.

This problem has been solved with the power transmission system using a pressurized fluid as disclosed by Claim 1:

SUMMARY OF THE INVENTION

A power transmission system using a pressurized fluid is provided. In an embodiment, the inventive pressurized fluid power transmission system is configured as a hydraulic system. This system comprises a pressure source and a load, between which a damping device is arranged. This device comprises at least two channels which are arranged parallel with respect to each other and exhibit different damping properties. For example, one of the channels comprises one or more pulsation dampers while the other channel comprises differently tuned pulsation dampers, or may even be configured as a bypass channel which does not comprise any pulsation dampers or other dampers. The channels are associated with a valve means which effects the pressure distribution to the channels as a function of the pressure applied to one selected point of the damping device. As a result, at least one of the channels is activated in a pressure-dependent manner, i.e., opened or closed, or even more or less opened. Consequently, the properties of the damping device vary, depending on the pressure at a selected site of the power transmission system. As a result, it is possible to work on the one hand with a greater damping effect in certain states of operation of the power transmission system and on the other hand with a lesser damping effect in certain other states of operation. In conjunction with the change of the damping effect, there usually is a change of the flow resistance provided by the damping device, consequently, it is possible, in accordance with the inventive power transmission system, to adapt the flow resistance provided by the damping device to the states of operation of the power transmission systems, i.e., in particular, to the load ratios. For example, the power transmission system may be used as a hydraulic system in motor vehicles. In straight-line driving mode, which does not require any steering assistance, a channel provided in the damping device and acting as a bypass may be opened. The power transmission system is in recirculating mode, so that in this instance damping is not important. However, the reduced flow resistance in the bypass channel in this operating state requires only little power in order to maintain the recirculating mode, so that only a small load is applied by the hydraulic pump (pressure source) to the engine of the motor vehicle.

When a steering action is initiated, the flow resistance of the hydraulic actuator device—which is used for steering assistance—increases. Corresponding thereto, the pressure in or at the damping device increases. This pressure causes the valve means to switch preferably suddenly or, if needed, also in a sliding manner, so that the bypass channel or another channel with low flow resistance used during recirculating mode is now increasingly throttled. Now, increasingly, fluid is forced to flow through the parallel channel which contains at least one pulsation damper. In doing so, pulsations, pressure shocks, and vibrations, which could be caused by the pressure source, are kept away from the load. Conversely, pulsations, vibrations, and pressure shocks which can originate from the load, are kept away from the pressure source. Consequently, any power losses which could occur at the dampers of the damping devices are largely restricted to briefly occurring steering actions. A hydraulic level control may occur in a similar manner.

Consequently, the inventive power transmission system activates its dampers only when a power transmission actually occurs between the pressure source and the load In idling mode (recirculating mode), i.e., when no appreciable power is transmitted from the pressure source to the load, the dampers—which inevitably involve energy losses—are at least partially deactivated.

Furthermore, the inventive power transmission system permits the use of the pulsation dampers, mainly when pulsations actually do occur. This is a function of load, for example. In addition, the frequency spectrum of the pulsations may change in response to the load. Also, in this case, the inventive power transmission system offers the option of activating or deactivating the pulsation damper adapted for specific pulsations as a function of the operating state of the power transmission system.

The damping device may have two or more channels arranged parallel to each other. They may be connected with each other on their respective input sides and switched on their output sides, or they may be connected with each other on their output sides and switched on their input sides. This switching operation may be performed by bypass valves. However, in preferred embodiments, the channel to be deactivated only contains a shut-off valve which closes when the pressure increases, for example. This shut-off valve is preferably arranged in that one of the two channels which exhibits the lower flow resistance. This channel may be considered as the bypass channel which, for example, is gradually blocked as the pressure of the system is increased.

For example, as mentioned, it is basically possible to activate or deactivate the channels in a surge-like manner. This, however, may result in a noticeable change of the behavior of the overall system. For example, considering a motor vehicle steering system using hydraulic assistance, the degree of steering assistance would change suddenly. In those cases, a smooth transition between activated and deactivated channel is preferred. This sliding mode of operation allows the fading-over or switching between channels, preferably in a manner that is substantially free of hysteresis effects. In contrast, when a sliding transition is used, it is advantageous if a certain switching hysteresis exists in order to avoid vibration conditions, i.e., in order to avoid a constant hunting of the valve means certain states.

In order to switch the valve means, the valve actuating pressure is preferably drawn from the damping device or another point of the power transmission system. By means of a suitable pressure-activated driving arrangement, the pressure may be used for moving the valve means. Preferably, the actuation arrangement comprises a spring means which generates a counter-force. In many cases, it is sufficient if the spring means exhibits a linear force-versus-path characteristic. In individual cases, it may be useful if a nonlinear force-versus-path characteristic is provided. This allows compensation of a non-linear valve characteristic. In other cases, it may even be desirable to employ a non-linear characteristic for switching between the two channels.

BRIEF DESCRIPTION OF THE DRAWINGS

Additional details of advantageous embodiments of the invention are obvious from the drawings, the specification or the subclaims.

DETAILED DESCRIPTION OF THE INVENTION

Figure 1:
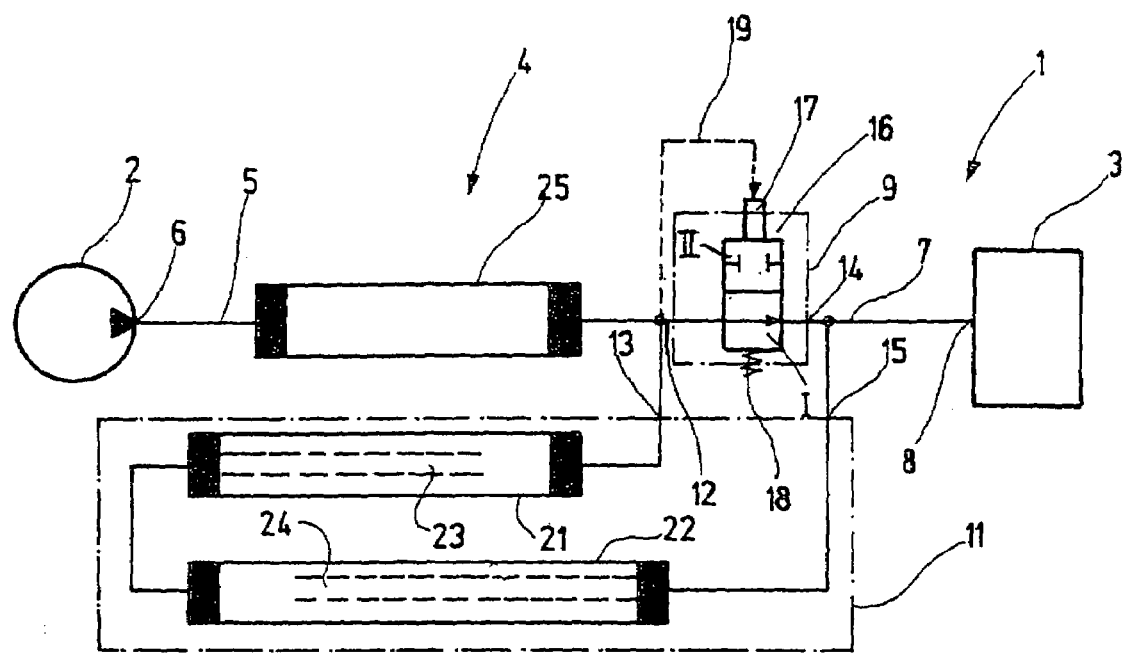
FIG. 1 is a schematic illustration of an invention pressurized fluid power transmission system and FIGS. 2–5 are schematic illustrations of modified forms of embodiments of inventive power transmission systems.

FIG. 1 shows a hydraulic system 1 which uses an incompressible fluid, such as for example hydraulic oil, as a pressurized fluid. This means is used for the transmission of the mechanical output of a pressure source 2 to a user 3. Consequently, hydraulic system 1 is a pressurized fluid power transmission system comprising. Pressure source 2, for example, is a hydraulic pump provided on a motor vehicle. Load 3, for example, is a steering gear, a valve block or another actuator to be driven by pressure source 2. A damping device 4 is interposed between pressure source 2 and load 3. Input 5 of this damping device is connected with one output 6 of pressure source 2. Its output 7 is connected with one input 8 of load 3. A recirculating line from the load to pressure source 2 is provided, however not illustrated. (This applies to FIGS. 1 through 5.)

Damping device 4 contains at least two channels 9, 11, which are arranged parallel to each other. To achieve this, the input sides 12, 13 of channels 9, 11, as well as their output sides 14, 15, are connected with each other. Channel 9 is configured as a bypass channel and, in this form of embodiment, does not contain any damping devices or the like; however, it does contain a shut-off valve 16 which acts as a valve means for dividing the hydraulic fluid between channels 9, 11. Shut-off valve 16, located in the bypass channel (channel 9), has a first state I, in which it is fully open and enables channel 9, and a second state II, in which it blocks channel 9. Furthermore, said valve may adopt any states in between, in which it more or less throttles channel 9. Shut-off valve 16 is activated by the pressurized fluid. Said valve comprises a pressurized fluid drive 17 which, when pressure is applied, actuates shut-off valve 16 in closing direction against the force of a pressure spring 18. Pressurized fluid drive 17 is connected with input 12 of channel 9 by means of a line 19, for example. If desired, e.g., to avoid any switching hysteresis, line 19 may also be connected with the valve output.

Channel 11 contains at least one damper; however, in this instance it contains two dampers 21, 22, which are arranged in series. Both dampers 21, 22 are pulsation dampers, for example, each comprising an expansion hose and a tuner pipe 23, 24 located in said expansion hose. Each damper 21, 22 is adjusted to a specific pulsation frequency or a frequency band.

The two paralleling channels 9, 11 may be preceded by a joint damper 25 which connects the input of damping device 4 with the inputs 12, 13 of channels 9, 11. Damper 25 may be a pulsation damper adjusted for narrow or wide bands.

The so far described hydraulic system 1 operates as follows:

During operation, pressure source 2 constantly transports hydraulic fluid. If load 3 does not tap any power, it allows the fluid arriving at its input 8 to pass unimpeded and flow back to pressure source 2 through a not illustrated recirculating line. The hydraulic system operates in recirculating mode. In this state, the pressure tapped by line 19 is low in damping device 4. Consequently, shut-off valve 16 is in its state I, i.e., it allows unimpeded passage into channel 9. Consequently, the hydraulic fluid takes its path through damper 25 and then through channel 9 which is switched as the bypass to user 3. The flow through channel 11, which is also open, is comparatively lower because of this channel's greater flow resistance. Therefore, in order to maintain the hydraulic circulatory system, pressure source 2 requires only low power.

As explained above, user 3, for example, is a hydraulic actuator which assists the steering motion of a motor vehicle. If this user is activated by a steering motion, it offers increasing resistance to the hydraulic fluid which passes through. In doing so, the pressure in the damping device increases noticeably, specifically at input 12 of channel 9. In turn, this pressure triggers the initial closing operation of shut-off valve 16 by means of pressurized fluid drive 17. Therefore, channel 9 is throttled increasingly, thereby forcing increasingly more fluid to take the path through channel 11 and thus over dampers 21, 22. As a result, it is ensured that the increasing transmission of power causes the concurrent damping of pulsations between pressure source 2 and user 3. If, at maximum counter-pressure, shut-off valve 16 is closed completely, channel 9 is shut off.

Then, only channel 11 is active. Operation takes place with full pulsation damping. The connection between-the pressure tapped at line 19 and the fluid distribution to channels 9, 11, can be adjusted by selecting an appropriate force-versus-path characteristic for pressure spring 18.

If load 3 is deactivated, for example, by resetting the steering to straight-line mode of operation, the hydraulic fluid may again flow unimpeded through load 3. Hence, the pressure tapped by line 19 drops, and channel 9 is cleared as the pressure drops. Consequently, the system returns to recirculating operation with low pulsation damping. This is a low-loss operation and, hence, is maintained until load 3 becomes active again.

As an alternative, line 19 may lead to output 7 in order to exclude or reduce positive feedback effects. However, this also avoids any hysteresis which would be desirable to avoid vibrations in some cases.

Figure 2:
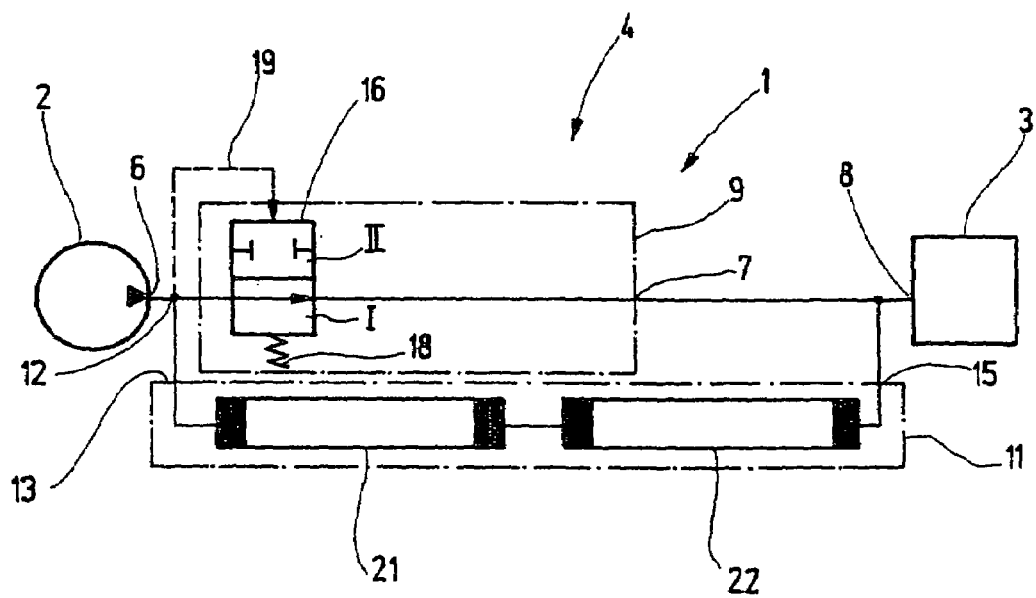

FIG. 2 shows a modified embodiment of hydraulic system 1. This embodiment is different from the above-described embodiment in that damper 25 was omitted. This results in an undamped but still extremely loss-free recirculating operation when channel 9 acting as bypass is left fully open, i.e., when there is no power decrease to load 3. In as much as these embodiments are otherwise completely identical, reference is made hereinafter to the above description and the application of the same reference numbers. For example, the number of dampers in channel 11 may vary as needed. Valve 16 may be located in or in front of channel 9.

Figure 3:
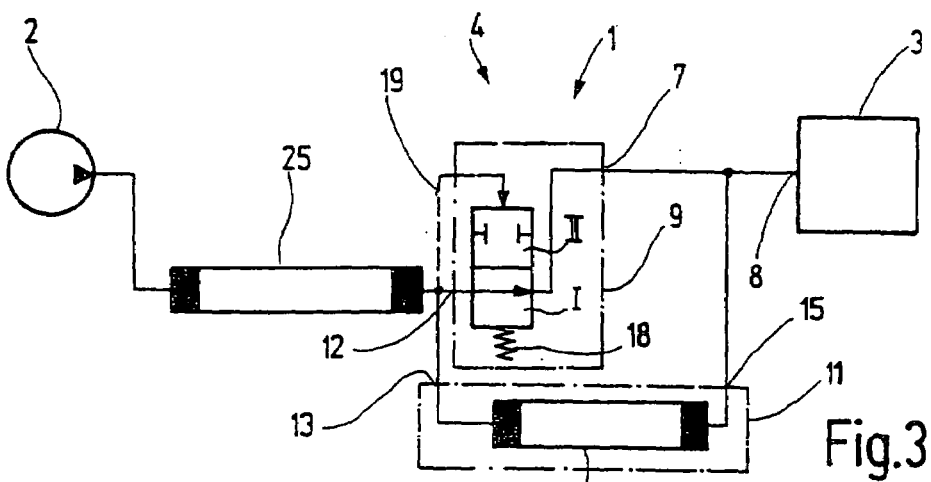

Another potential modification of hydraulic system 1 of FIG. 1 is sown by FIG. 3. Again, full reference is made to the description of the example of embodiment of FIG. 1. The same reference numbers apply. Different from the example of embodiment of FIG. 1, hydraulic system 1 of FIG. 3 comprises only one pulsation damper 21 in channel 11. Its flow resistance is considerably greater than that of open channel 9, so that this channel causes a substantially greater pressure drop. Therefore, when channel 9 is open (recirculating operation), only the combined total of the flow resistance of damper 25 and the substantially lower flow resistance of channel 9 is effective. Consequently, the pressure drop between pressure source 2 and load 3 is substantially determined by the pressure drop on damper 25. However, if load 3 removes power, channel 9 is closed more and more, so that damper 21 becomes active. Now the pressure drop of damping device 4 is added to the pressure drop of damper 21, so that there is an increased pressure drop, but also increased pulsation damping.

Figure 4:
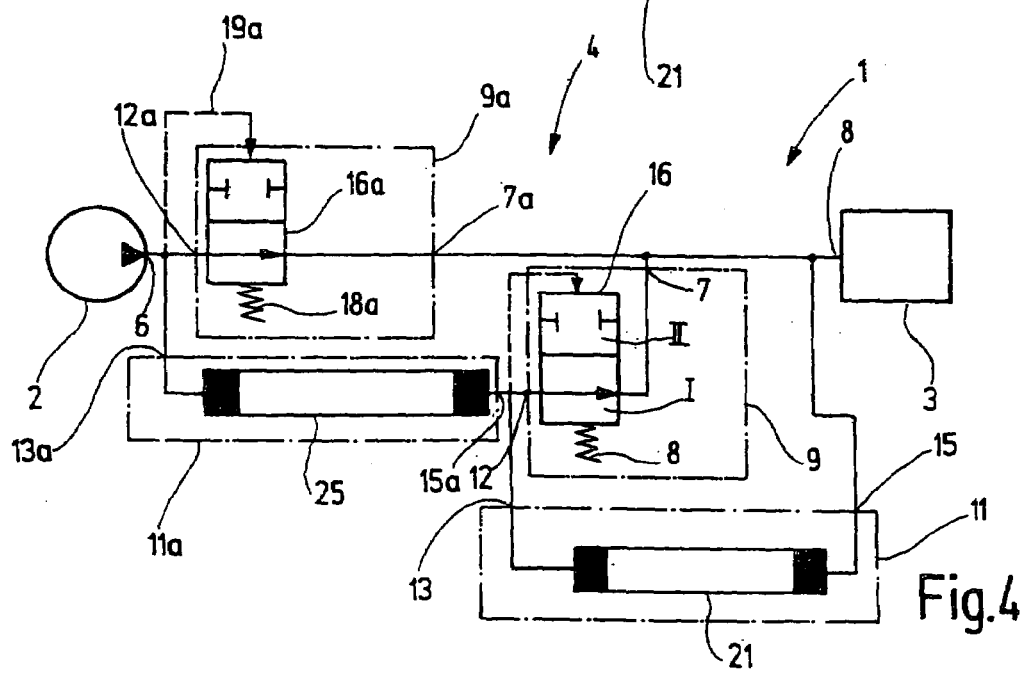

FIG. 4 shows another modified form of embodiment of hydraulic system 1. In this form of embodiment, both dampers 25, 21 are bridged by a bypass channel which is open as long as the system operates in recirculating mode. Dampers 21, 25, which are actuated only when load 3 requires mechanical power, may be designed for high pulsation damping effects. Concomitant pressure losses only occur during—as a rule—brief phases of the power drop, so that these phases are negligible regarding the energy balance of the system. In contrast, these phases are of no effect in recirculating mode.

Specifically, damper 21 is part of channel 11. Regarding this channel's description and function, reference is made to the description in conjunction with FIG. 3. The same applies to channel 9. Different therefrom, damper 25 forms a channel 11a which is associated with channel 9a. Input 13a of channel 11a is connected with input 12a of channel 9a. Both are located at output 6a of pressure source 2. While output 15a of channel 11a is connected with inputs 12, 13 of channels 9, 13, output 7a of channel 9a is connected with output 7 of channel 9. Consequently, channel 9a forms a bypass which bridges damping device 4 as a whole. This bypass is controlled by valve 16a which is connected with the output of pressure source 2 via a pressure line 19a.

This hydraulic system 1 is designed in such a manner that both shut-off valves 16, 16a are open in recirculating state. A low pressure drop exists. Pulsation damping does not occur. If load 3 decreases as a result of a corresponding control of power, a counter-pressure is created in hydraulic system 1, whereby this pressure initially causes valve 16a to close. As a result, damper 25 is activated increasingly. As the counter-pressure rises, valve 16 is also closed, which now also causes damper 21 to be activated. Thus, as power drops more and more, pulsation damping increases correspondingly. In doing so, shut-off valves 16, 16a may be dimensioned—by appropriately dimensioning pressure springs 18, 18a—in such a manner that they successively exert their blocking action or that they fix an overlap range in which shut-off valve 16 begins to close, while shut-off valve 16a more and more approaches its completely closed state II.

Also, in this system which permits extremely high pulsation damping, such damping is prompted only during phases of power transmission. Consequently, damping losses that occur will be limited to these brief phases.

Figure 5:
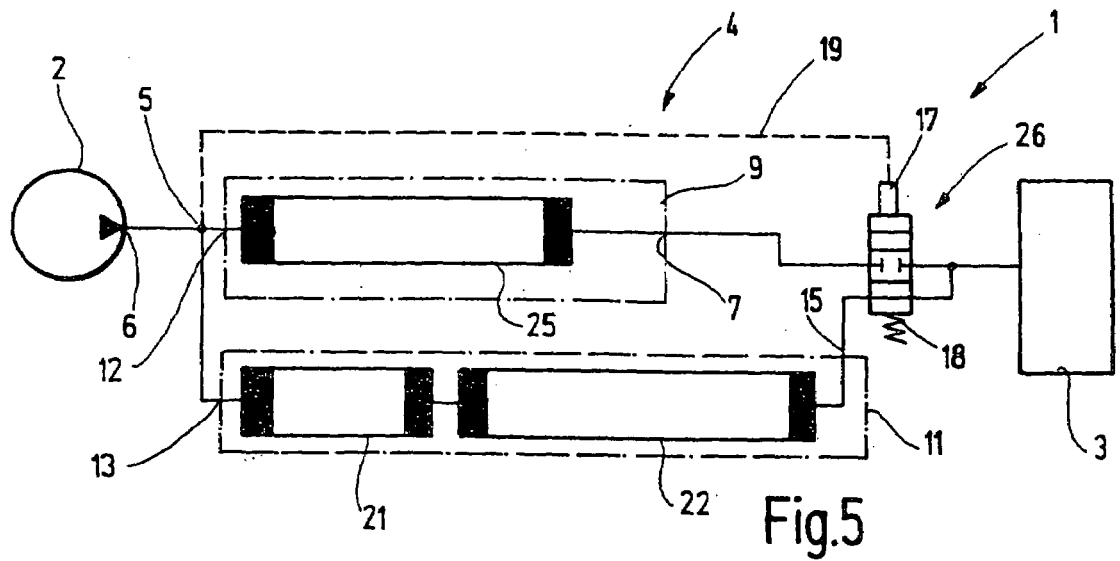

An even further modified embodiment of hydraulic system 1 is shown by FIG. 5. Regarding this, reference is made to the same reference numbers and the description of the hydraulic system of FIG. 1. The difference described hereinafter consists in the arrangement and configuration of the valve means. As such, a switching valve 26 is provided which, alternately, connects the outputs of channels 9, 11 with load 3. In addition, channel 9 is not purely a bypass channel but contains damping element 25. It may be omitted, if required. If required, pressure line 19 may be connected with input 5 of damping device 4 or with another point of hydraulic system 1.

Hydraulic systems 1, as a rule, contain expansion hose lines and other damping elements 21, 22, which, depending on the generated pressure pulsation, are provided with one or more serially connected hose chambers. These chambers represent the flow resistance, as well as the resilience and inertia features of the system, which result in the damping of input pressure signals. Frequently, the pulsation of the pump increases with static pressure, i.e., for example, with the degree and intensity of the steering operations or with the degree of assistance of a hydraulically active assistance system. Pulsations may be minimized by damping measures, as a result of which the pressure loss increases and, hence, the energy loss increases. This situation is remedied by the invention in that, during the operation of a hydraulic circulatory system, the damping measures are activated as a function of pressure. As a result of this, a minimal pressure loss and considerable energy savings are possible in recirculating mode. This is achieved by a direct line connection which is provided between pressure source 2 and user 3, and which bridges the dampers. This short-circuit line is blocked by a valve when a pressure increase occurs in the system. Inasmuch as the pressure loss occurring on the damper occurs only very briefly, damping elements featuring a strong damping effect and a high pressure loss and having an extremely strong damping effect on pressure fluctuations can be used during these brief periods of time. Still, considering the mean time of activation, an improved energy balance can be achieved.

The invention claimed is:

1. A pressurized fluid power transmission system, comprising:
   a pressure source;
   a load; and a damping device interposed between the pressure source and the load, the damping device including at least two channels arranged parallel to each other and having different flow resistances, the channels being controlled by a valve means that affects the flow distribution to the channels as a function of the pressure at a selected point of the power transmission system by at least partially closing the channel having a lower flow resistance in response to an increase in pressure sensed at the selected point, wherein at least one of the channels contains at least one pulsation damper that includes an expansion hose containing at least one resonator pipe or reflector.

2. The pressurized fluid power transmission system in accordance with claim 1, wherein the channel that has a greater flow resistance contains the at least one pulsation damper.

3. The pressurized fluid power transmission system in accordance with claim 1, wherein each channel has one channel input, respectively, and one channel output, respectively, and that the channel inputs are connected with each other, and that the channel outputs are connected to the valve means.

4. The pressurized fluid power transmission system in accordance with claim 1, wherein the valve means is a switching valve.

5. The pressurized fluid power transmission system in accordance with claim 1, wherein the valve means is configured as a shut-off valve.

6. The pressurized fluid power transmission system in accordance with claim 5, wherein the valve means, when opening and closing between the closing state and the opening state, features a gradual smooth transition.

7. A pressurized fluid power transmission system, comprising:

a pressure source;

a load; and a damping device interposed between the pressure source and the load, the damping device including at least two channels arranged parallel to each other and having different flow resistances, the channels being controlled by a switching valve that includes a gradual, sliding transition when switching between the channels, wherein the switching valve affects the flow distribution to the channels as a function of the pressure at a selected point of the power transmission system by at least partially closing the channel having a lower flow resistance in response to an increase in pressure sensed at the selected point, wherein each channel has one channel input respectively, and one channel output respectively, and that the channel outputs are connected with each other, and that the channel inputs are connected with each other via the switching valve.

8. A pressurized fluid power transmission system, comprising:

a pressure source;

a load; and a damping device interposed between the pressure source and the load, the damping device including at least two channels arranged parallel to each other and having different flow resistances, the channels being controlled by a valve means that affects the flow distribution to the channels as a function of the pressure at a selected point of the power transmission system by at least partially closing the channel having a lower flow resistance in response to an increase in pressure sensed at the selected point, wherein the valve means is connected with a fluid-activating device which actuates the valve means, the fluid-activating device containing a spring means that exhibits a non-linear force-versus-path characteristic to counteract the generated force of actuation.

9. The pressurized fluid power transmission system in accordance with claim 8, wherein the fluid-activating device comprises an input line which is connected with a line leading to the valve means in order to tap the control and actuation pressure.

10. A pressurized fluid power transmission system, comprising:

a pressure source;

a load; and a damping device arranged between the pressure source and the load, the damping device including at least two channels arranged parallel to each other, the at least two channels including a first channel and a second channel having a greater flow resistance than the first channel, wherein the second channel includes at least one pulsation damper having an expansion hose containing at least one resonator pipe or reflector, the channels being controlled by a valve that affects the flow distribution to the channels as a function of pressure by at least partially closing the first channel in response to an increase in pressure in the power transmission system.

11. The pressurized fluid power transmission system in accordance with claim 10, wherein the valve is configured as a shut-off valve.

12. The pressurized fluid power transmission system in accordance with claim 10, wherein the valve is connected to a fluid-activating device that actuates the valve.

* * * * *